(12) United States Patent
Seong et al.

(10) Patent No.: US 9,070,926 B2
(45) Date of Patent: Jun. 30, 2015

(54) BATTERY MODULE WITH FIXING MEMBERS

(71) Applicant: LG CHEM, LTD., Seoul (KR)

(72) Inventors: Jun Yeob Seong, Daejeon (KR); Bum Hyun Lee, Daejeon (KR); Dal Mo Kang, Daejeon (KR); Jung Min Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/510,308

(22) Filed: Oct. 9, 2014

(65) Prior Publication Data

US 2015/0024252 A1 Jan. 22, 2015

Related U.S. Application Data

(63) Continuation of application No. PCT/KR2013/003885, filed on May 6, 2013.

(30) Foreign Application Priority Data

May 7, 2012 (KR) .......... 10-2012-0047926

(51) Int. Cl.
*H01M 2/10* (2006.01)
*H01M 2/02* (2006.01)
(Continued)

(52) U.S. Cl.
CPC .......... *H01M 2/1077* (2013.01); *H01M 2/0237* (2013.01); *H01M 2/1083* (2013.01); *H01M 10/0525* (2013.01); *H01M 2220/10* (2013.01); *H01M 2220/20* (2013.01); *H01M 10/052* (2013.01)

(58) Field of Classification Search
CPC .. H01M 2/206; H01M 2/1077; H01M 2/1083
USPC .................................. 429/7, 61, 99
See application file for complete search history.

(56) References Cited

U.S. PATENT DOCUMENTS

2009/0258282 A1* 10/2009 Harada et al. ................ 429/61
2009/0305116 A1* 12/2009 Yang et al. ................... 429/61
(Continued)

FOREIGN PATENT DOCUMENTS

AU 38387/78 A 9/1978
EP 1 030 388 A1 8/2000
(Continued)

OTHER PUBLICATIONS

International Search Report issued in PCT/KR2013/003885, mailed on Aug. 21, 2013.
Supplementary European Search Report mailed Dec. 23, 2014.

*Primary Examiner* — Stewart Fraser
(74) *Attorney, Agent, or Firm* — Birch, Stewart, Kolasch & Birch, LLP

(57) ABSTRACT

Disclosed herein is a battery module including a plurality of battery cells, the battery module including the battery cells being stacked in a state in which electrode terminals are electrically connected to each other, a pair of cell covers coupled to each other to surround the entirety of an outside of a battery cell stack including two or more battery cells excluding the electrode terminals of the battery cells, and fixing members mounted at the cell covers in contact with the outside of the battery cell stack to properly fix the battery cells in the cell covers.

20 Claims, 7 Drawing Sheets

(51) Int. Cl.
*H01M 10/0525* (2010.01)
*H01M 10/052* (2010.01)

(56) References Cited

U.S. PATENT DOCUMENTS

| | | | |
|---|---|---|---|
| 2012/0052345 A1* | 3/2012 | Kai et al. | 429/61 |
| 2012/0164504 A1* | 6/2012 | Takashina et al. | 429/99 |
| 2012/0183820 A1* | 7/2012 | Yoon et al. | 429/61 |
| 2012/0214039 A1* | 8/2012 | Yoon et al. | 429/99 |
| 2012/0301747 A1* | 11/2012 | Han et al. | 429/7 |
| 2013/0236761 A1* | 9/2013 | Seong et al. | 429/99 |

FOREIGN PATENT DOCUMENTS

| | | |
|---|---|---|
| EP | 1 071 147 A1 | 1/2001 |
| JP | 11-25939 A | 1/1999 |
| JP | 2000-323111 A | 11/2000 |
| JP | 2004-139924 A | 5/2004 |
| JP | 2009-163932 A | 7/2009 |
| KR | 10-0870461 B1 | 11/2008 |
| KR | 10-2012-0039796 A | 4/2012 |
| WO | WO 2005/074054 A1 | 8/2005 |

* cited by examiner

BATTERY MODULE WITH FIXING MEMBERS

CROSS REFERENCE TO RELATED APPLICATIONS

This application is a Continuation of PCT International Application No. PCT/KR2013/003885, filed on May 6, 2013, which claims priority under 35 U.S.C. 119(a) to Patent Application No. 10-2012-0047926, filed in Korea on May 7, 2012, all of which are hereby expressly incorporated by reference into the present application.

TECHNICAL FIELD

The present invention relates to a battery module including a plurality of battery cells, the battery module including the battery cells being stacked in a state in which electrode terminals are electrically connected to each other, a pair of cell covers coupled to each other to surround the entirety of an outside of a battery cell stack including two or more battery cells excluding the electrode terminals of the battery cells, and fixing members mounted at the cell covers in contact with the outside of the battery cell stack to properly fix the battery cells in the cell covers.

BACKGROUND ART

In recent years, secondary batteries, which can be charged and discharged, have been widely used as an energy source for wireless mobile devices. In addition, the secondary batteries have attracted considerable attention as an energy source for electric vehicles and hybrid electric vehicles, which have been developed to solve problems, such as air pollution, caused by existing gasoline and diesel vehicles using fossil fuel. Therefore, the secondary batteries are being applied to an increasing number of applications owing to advantages thereof and, in the future, the secondary batteries are expected to be applied to even more applications and products.

As applications and products, to which the secondary batteries are applicable, are increased, kinds of batteries are also increased such that the batteries can provide powers and capacities corresponding to the various applications and products. In addition, there is a strong need to reduce the size and weight of the batteries applied to the corresponding applications and products.

Small-sized mobile devices, such as a mobile phone, a personal digital assistant (PDA), a digital camera, and a laptop computer, use one or several small-sized, lightweight battery cells for each device according to the reduction in size and weight of the corresponding products. On the other hand, middle or large-sized devices, such as an electric bicycle, an electric motorcycle, an electric vehicle, and a hybrid electric vehicle, use a middle or large-sized battery module (a middle or large-sized battery pack) having a plurality of battery cells electrically connected with each other because high power and large capacity are necessary for the middle or large-sized devices.

The size and weight of a battery module is directly related to an accommodation space and power of a corresponding middle or large-sized device. For this reason, manufacturers are trying to manufacture small-sized, lightweight battery modules. Furthermore, for devices, such as an electric bicycle and an electric vehicle, which are subject to a large number of external impacts and vibrations, require stable electrical connection and physical coupling between components constituting the battery module. In addition, a plurality of battery cells is used to accomplish high power and capacity and, therefore, the safety of the battery module is regarded as important.

A cylindrical battery cell, a prismatic battery cell, and a pouch-shaped battery cell, which are classified based on their shapes, are used as a unit cell of such a battery module or battery pack. Especially, the pouch-shaped battery cell, which can be stacked with high integration, has a high energy density per weight, is inexpensive, and can be easily modified, has attracted considerable attention.

FIG. 1 is a perspective view typically showing a conventional representative pouch-shaped battery cell. The pouch-shaped battery cell 10 shown in FIG. 1 is configured to have a structure in which two electrode leads 11 and 12 protrude from the upper and lower ends of a battery body 13, respectively, in a state in which the electrode leads 11 and 12 are opposite to each other. A battery case 14 includes upper and lower case parts. That is, the battery case 14 is a two-unit member. An electrode assembly (not shown) is received in a receiving part which is defined between the upper and lower case parts of the battery case 14. The opposite sides 14b and the upper and lower ends 14a and 14c, which are contact regions of the upper and lower case parts of the battery case 14, are bonded to each other, whereby the battery cell 10 is manufactured. The battery case 14 is configured to have a laminate structure of a resin layer/a metal film layer/a resin layer. Consequently, it is possible to bond the opposite sides 14b and the upper and lower ends 14a and 14c of the upper and lower case parts of the battery case 14, which are in contact with each other, to each other by applying heat and pressure to the opposite sides 14b and the upper and lower ends 14a and 14c of the upper and lower case parts of the battery case 14 so as to weld the resin layers thereof to each other. According to circumstances, the opposite sides 14b and the upper and lower ends 14a and 14c of the upper and lower case parts of the battery case 14 may be bonded to each other using a bonding agent.

However, the mechanical strength of the battery case 14 is low. In order to solve this problem, there has been proposed a method of mounting battery cells (unit cells) in a pack case, such as a cartridge, so as to manufacture a battery module having a stable structure. On the other hand, a device or a vehicle, in which a middle- or large-sized battery module is installed, has a limited installation space. Consequently, in a case in which the size of the battery module is increased due to the use of the pack case, such as the cartridge, the spatial utilization is lowered.

In addition, the electrode assembly constituting the battery cell is mounted in the battery case in a state in which the electrode assembly is surrounded by the battery case but is not fixed by the battery case. For this reason, the electrode assembly may move toward the electrode leads or may be bent due to external impact or vibration. As a result, an internal short circuit may occur in the battery cell or the electrode assembly may protrude through the battery case, which seriously reduces safety of the battery cell.

Furthermore, the electrode assembly constituting the battery cell repeatedly expands and contracts during charge and discharge of the battery cell. As a result, the thermally welded regions of the battery case may be easily separated from each other and, therefore, an electrolyte may leak from the battery case. In addition, the distance in cathodes and anodes of the electrode assembly may be changed during repeated expansion and contraction of the battery cell with the result that internal resistance of the battery cell may be increased or a short circuit may occur in the battery cell, which causes abrupt lowering in performance of the battery cell.

In order to solve the above problem, a structure in which battery cells are covered by cell covers is used. For a battery module having pouch-shaped battery cells mounted in cell covers, however, a gap may be provided between the battery cells and the cell covers due to structural limitations of the battery cells. As a result, the battery cells may not be securely fixed and may move when impact is applied to the battery cells.

Therefore, there is a high necessity for a battery module having higher stability while solving the above problems.

DISCLOSURE

Technical Problem

Therefore, the present invention has been made to solve the above problems and other technical problems that have yet to be resolved.

Specifically, it is an object of the present invention to provide a battery module configured to have a structure in which battery cells are stably fixed in cell covers, thereby eliminating a possibility that short circuits will occur in the battery cells when external impact is applied to the battery module, and vibration characteristics of the battery module is improved, whereby malfunction of the battery cells is prevented.

Technical Solution

In accordance with one aspect of the present invention, the above and other objects can be accomplished by the provision of a battery module including a plurality of battery cells, the battery module including the battery cells being stacked in a state in which electrode terminals are electrically connected to each other, a pair of cell covers coupled to each other to surround the entirety of an outside of a battery cell stack including two or more battery cells excluding the electrode terminals of the battery cells, and fixing members mounted at the cell covers in contact with the outside of the battery cell stack to properly fix the battery cells in the cell covers.

That is, in the battery module according to the present invention, the battery cells are mounted in the cell covers and the battery cells are more securely fixed by the fixing members mounted at the cell covers. Consequently, it is possible restrain a phenomenon in which the battery cells are pushed due to external impact and to improve vibration characteristics of the battery module, thereby preventing malfunction of the battery cells and increasing lifespan of the battery cells.

In addition, a deviation in dimensions between the battery cells and the cell covers caused during a manufacturing process is eliminated by the fixing members. Consequently, the battery cells may be more stably fixed in the cell covers.

Each of the battery cells may be a plate-shaped battery cell that is capable of providing a high stacking rate in a limited space. For example, each of the battery cells may be a pouch-shaped battery cell configured to have a structure in which an electrode assembly is mounted in a battery case made of a laminate sheet including a resin layer and a metal layer.

Specifically, each of the battery cells may be a pouch-shaped battery cell configured to have a structure in which an electrode assembly of a cathode/separator/anode structure is mounted in a battery case together with an electrolyte in a sealed state. For example, each of the battery cells may be a plate-shaped battery cell configured to have an approximately rectangular hexahedral structure having a small thickness to width ratio. Generally, the pouch-shaped battery cell includes a pouch-shaped battery case. The battery case is configured to have a laminate sheet structure in which an outer coating layer formed of a polymer resin exhibiting high durability, a barrier layer formed of a metal material blocking moisture or air, and an inner sealant layer formed of a thermally bondable polymer resin are sequentially stacked.

The battery case of the pouch-shaped battery cell may be configured to have various structures. For example, the battery case of the pouch-shaped battery cell may be configured to have a structure in which an electrode assembly is received in a receiving part formed at an upper inner surface and/or a lower inner surface of a two-unit member and upper and lower contact regions of the battery case are sealed. The pouch-shaped battery cell with the above-stated construction is disclosed in PCT International Application No. PCT/KR2004/003312, which has been filed in the name of the applicant of the present patent application. The disclosure of the above-mentioned patent application is hereby incorporated by reference as if fully set forth herein.

The electrode assembly includes cathodes and anodes, by which charge and discharge of each of the battery cells are possible. The electrode assembly may be configured to have a structure in which cathodes and anodes are stacked in a state in which separators are disposed respectively between the cathodes and the anodes. For example, the electrode assembly may be configured to have a jelly-roll type structure, a stacked type structure, or a stacked/folded type structure. The cathodes and the anodes of the electrode assembly may be configured such that electrode tabs of the cathodes and electrode tabs of the anodes directly protrude outward from each of the battery cells. Alternatively, the cathodes and the anodes of the electrode assembly may be configured such that the electrode tabs of the cathodes and the electrode tabs of the anodes are connected to additional electrode leads and the electrode leads protrude outward from each of the battery cells. Electrode terminals constituted by the electrode tabs or the electrode leads may be configured such that a cathode terminal protrudes from one side of each of the battery cells and an anode terminal protrudes from the other side of each of the battery cells.

Each of the battery cells is not particularly restricted so long as each of the battery cells is a secondary battery that is capable of providing high voltage and high current when a battery module or a battery pack is constituted by the battery cells. For example, each of the battery cells may be a lithium secondary battery having a large energy storage capacity per volume.

In a preferred example, two battery cells may be mounted in the cell covers such that opposite electrodes of the battery cells are adjacent to each other and the electrode terminals of the battery cells may be connected in series to each other. For example, one of the electrode terminals protruding in one direction of the battery cells may be bent upward and the other electrode terminal may be bent downward such that the bent portions of the electrode terminals are coupled to each other, whereby the electrode terminals are directly connected to each other.

The material for each of the fixing members is not particularly restricted so long as each of the fixing members is made of an elastic material. For example, each of the fixing members may be made of thermo plastic polyurethane (TPU) or silicone.

The fixing members, each of which is made of an elastic material, properly fix the battery cell stack while the fixing members do not apply excessive pressure to the battery cell stack. In addition, the fixing members absorb shock generated when external force and vibration are applied to the battery cell stack, thereby improving stability of the battery cells.

The structure in which the fixing members are mounted at the cell covers is not particularly restricted. The fixing members may be mounted at the cell covers in various structures.

In a preferred example, the cell covers may be provided with mounting through holes and the fixing members may be mounted at the cell covers in a state in which the fixing members are inserted through the mounting through holes. In this case, each of the fixing members may be configured to have a structure in which one side of each of the fixing members is tapered in a longitudinal direction of each of the fixing members such that the fixing members can be easily inserted through the mounting through holes.

In a concrete example, each of the fixing members may be configured to have a structure including a first protruding part protruding outwardly of a corresponding one of the cell covers when the first protruding part is inserted through a corresponding one of the mounting through holes, a second protruding part protruding inwardly of a corresponding one of the cell covers, the second protruding part contacting the outside of the battery cell stack, and a connection part inserted through a corresponding one of the mounting through holes.

That is, each of the fixing members may be configured to have a structure in which the first protruding part and the second protruding part are formed at opposite sides of the connection part. The first protruding part may be configured to have a tapered structure in which the first protruding part can be easily inserted through a corresponding one of the mounting through holes and the second protruding part may be formed in an arc shape in vertical section.

The maximum diameters of the first protruding part and the second protruding part are greater than the diameter of the connection part. When each of the fixing members is inserted through a corresponding one of the mounting through holes, therefore, the first protruding part is elastically inserted through a corresponding one of the mounting through holes, whereby the fixing members are stably mounted at the cell covers.

In order to effectively fix the battery cell stack disposed inside the cell covers, two or more fixing members may be mounted at the cell covers.

For example, a first fixing member contacting an upper corner of the battery cell stack and a second fixing member contacting a lower corner of the battery cell stack may be mounted at the cell covers.

In order to locate the battery cell stack in the cell covers, the cell covers may be provided with step parts corresponding to the upper corner and the lower corner of the battery cell stack. That is, the step parts corresponding to the upper corner and the lower corner of the battery cell stack may be formed at the cell covers to reduce a dead space between the cell covers and the battery cells. In this case, the first fixing member and the second fixing member may be mounted at the step parts of the cell covers to more effectively fix the battery cells in the cell covers.

In a concrete example, the battery cell stack may be formed in the shape of a rectangular parallelepiped and at least eight fixing members may be mounted at the cell covers such that the fixing members contact four upper corners and four lower corners of the battery cell stack. The number of the fixing members is not particularly restricted so long as the fixing members can more effectively fix the battery cell stack.

In accordance with another aspect of the present invention, there is provided a battery pack including the battery module with the above-stated construction as a unit module.

The battery pack may be manufactured by combining battery modules as unit modules based on desired power and capacity. In addition, the battery pack according to the present invention may be used as a power source for an electric vehicle, a hybrid electric vehicle, a plug-in hybrid electric vehicle, or a power storage unit in consideration of installation efficiency and structural stability. However, an applicable range of the battery pack according to the present invention is not limited thereto.

In accordance with a further aspect of the present invention, there is provided a device including the battery pack with the above-stated construction as a power source. Specifically, the device may be an electric vehicle, a hybrid electric vehicle, a plug-in hybrid electric vehicle, or a power storage unit.

The structure and manufacturing method of the device are well known in the art to which the present invention pertains and, therefore, a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 1:
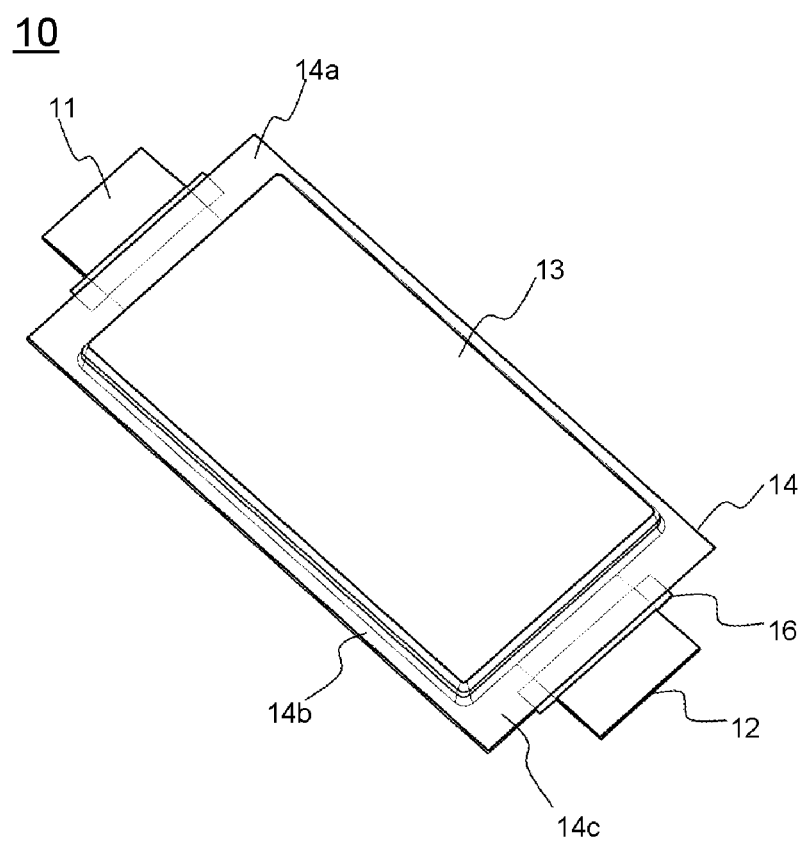
FIG. 1 is a perspective view showing a conventional pouch-shaped secondary battery.
Figure 2:
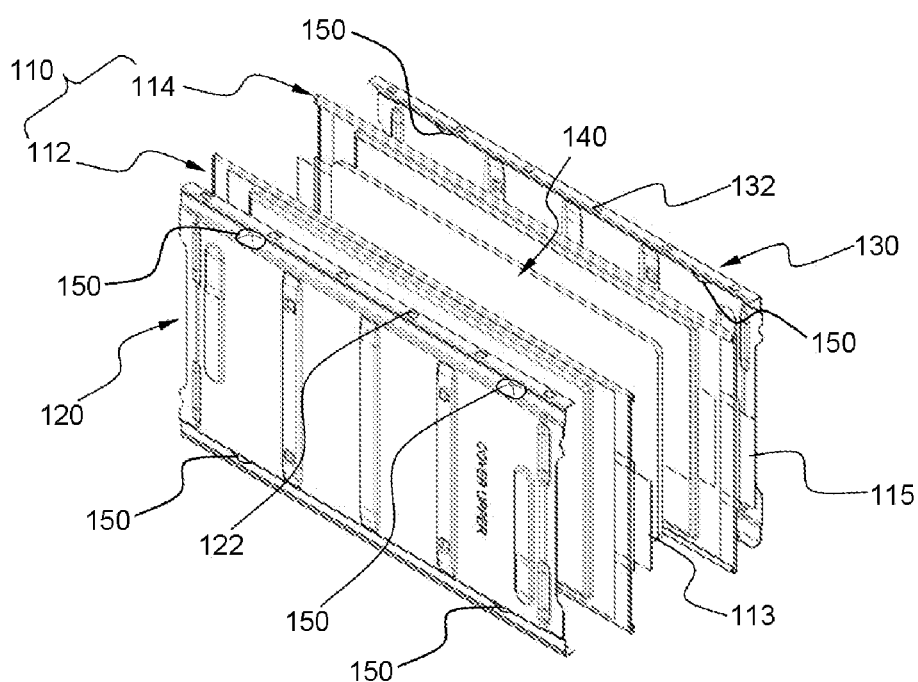
FIG. 2 is an exploded perspective view showing a battery module according to an embodiment of the present invention.
Figure 3:
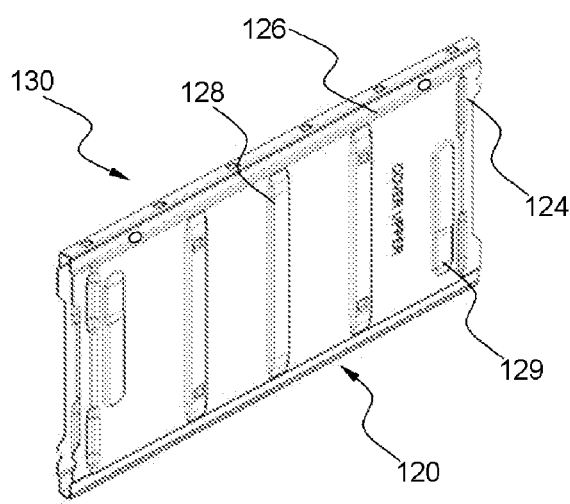
FIG. 3 is a perspective view of cell covers shown in FIG. 2.

FIG. 2 is an exploded perspective view typically showing a battery module according to an embodiment of the present invention and FIG. 3 is a perspective view typically showing cell covers included in the battery module of FIG. 2.

Referring first to FIG. 2, the battery module 100 includes two plate-shaped battery cells 112 and 114 and a pair of cell covers 120 and 130. Elastic fixing members to properly fix the battery cells 112 and 114 in the cell covers 120 and 130 are mounted at the cell covers 120 and 130.

Each of the battery cells 112 and 114 is configured to have a structure in which a battery case made of a laminate sheet including a metal layer and a resin layer is sealed at the outer circumference thereof in a state in which an electrode assembly is mounted in the battery case. The battery cells 112 and 114 are stacked in a state in which electrode terminals 113 and 115 are connected in series to each other.

In addition, the cell covers 120 and 130 are coupled to each other to surround the entirety of an outside of a battery cell stack 110 constituted by the two battery cells 112 and 114, which are laterally stacked, excluding the electrode terminals of the battery cells 112 and 114.

The electrode terminals 113 and 115 formed at the respective battery cells 112 and 114 are bent and connected in series to each other by welding. The cell covers 120 and 130 have inside structures corresponding to an outside shape of the battery cell stack 110. The cell covers 120 and 130 are coupled to each other in an assembly fastening fashion.

Specifically, the cell covers 120 and 130 have fastening protrusions 122 formed at a side coupling part of the cell cover 120 and fastening grooves 132 formed at a side coupling part of the cell cover 130. When the cell covers 120 and 130 are pushed toward each other in a state in which the cell covers 120 and 130 are in contact with each other such that the cell covers 120 and 130 face each other, therefore, the side coupling part of the metal housings are engaged with each other by elastic coupling.

On the other hand, a shock absorbing member 140 is interposed between the two battery cells 112 and 114. The shock absorbing member 140 is made of a porous polymer resin. Consequently, the shock absorbing member 140 absorbs the change in volume of the battery cells 112 and 114 caused by repetitive expansion and contraction of the battery cells 112 and 114 during charge and discharge of the battery cells 112 and 114. In addition, the shock absorbing member 140 increases frictional force between the battery cells 112 and 114 to restrain movement of the battery cells. However, the shock absorbing member 140 may not be provided.

Referring to FIG. 3, step parts 240 are provided at sides 124 of the cell covers 120 and 130 adjacent to upper and lower ends thereof and at sides 126 of the cell covers 120 and 130 adjacent to left and right ends thereof to easily fix the module In addition, the cell covers 120 and 130 are provided at outsides thereof with a plurality of linear beads 128, which are spaced apart from each other in a lateral direction. Each of the beads 128 is configured such that opposite ends of each of the beads 128 extend to corresponding ends of the cell covers 120 and 130. In a state in which battery modules are stacked, therefore, a coolant (for example, air) may flow in the lateral direction of the cell covers 120 and 130, thereby further improving cooling efficiency.

The cell covers 120 and 130 are provided at the upper and lower ends of the outsides thereof with bars 129 formed in shapes opposite to each other in the lateral direction (horizontal direction). When the battery modules are stacked, therefore, the cell covers 120 and 130 have shapes corresponding to adjacent ones of the battery modules. Consequently, it is possible to prevent stacked positions between the battery modules from being reversed or deviating from each other.

Figure 4:
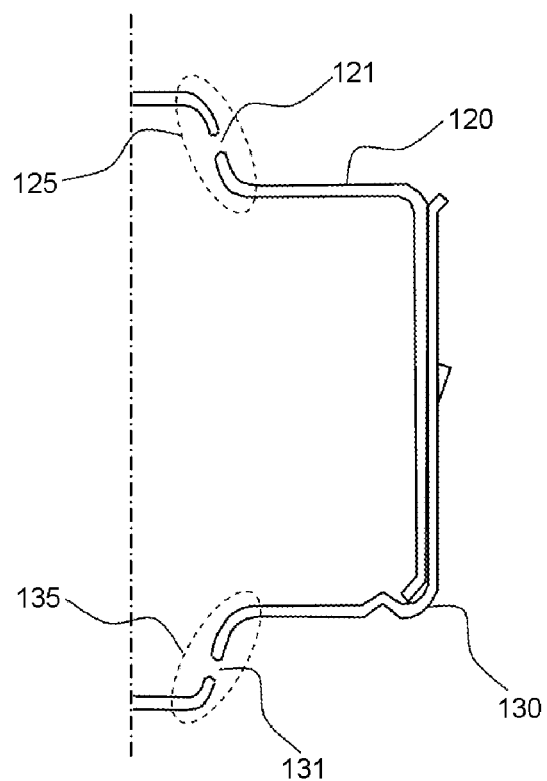
FIG. 4 is a partial sectional view showing the cell covers of FIG. 3.
Figure 5:
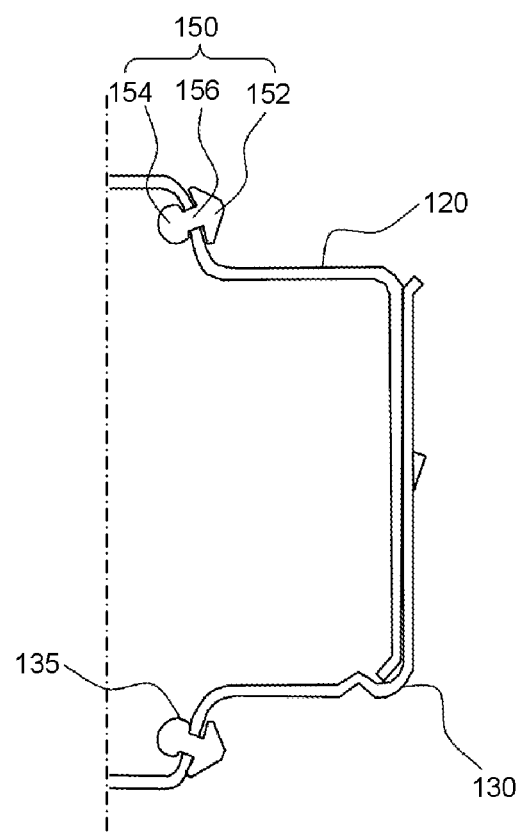
FIG. 5 is a sectional view showing a structure in which fixing members are mounted in FIG. 4.
Figure 6:
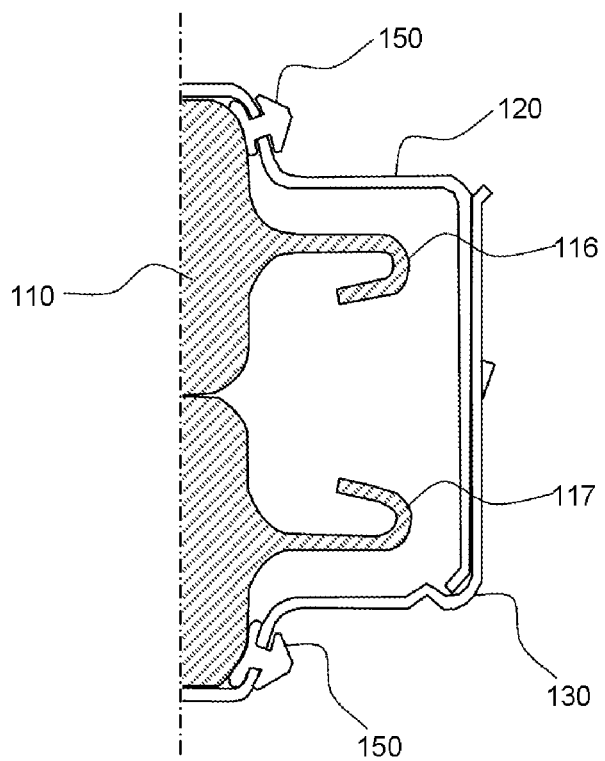
FIG. 6 is a sectional view showing a structure in which battery cells are loaded in FIG. 5.

FIGS. 4 to 6 are partial typical views showing fixing members mounted at the cell covers and a process of loading the battery cells.

Referring to these drawings, portions of the cell covers 120 and 130 at which the step parts are formed are provided with mounting through holes 121 and 131 for mounting fixing members 150. The mounting through holes 121 and 131 are formed at the portions of the cell covers 120 and 130 corresponding to the upper and lower corners of the battery cell stack 110. The upper and lower corners of the battery cell stack 110 are opposite corners adjacent to one side at which the electrode terminals of the battery cells are located.

Each of the fixing members 150 is configured to have a structure including a first protruding part 152 protruding outwardly of a corresponding one of the cell covers 120 and 130 in a state in which the first protruding part 152 is inserted through a corresponding one of the mounting through holes 121 and 131, the first protruding part 152 having a tapered structure in which the first protruding part 152 can be easily inserted through a corresponding one of the mounting through holes 121 and 131, a second protruding part 154 protruding inwardly of a corresponding one of the cell covers 120 and 130, a vertical section of the second protruding part 154 contacting the outside of the battery cell stack being formed in an arc shape, and a connection part 156 connected between the first protruding part 152 and the second protruding part 154 in a state in which connection part 156 is inserted through a corresponding one of the mounting through holes 121 and 131 when each of the fixing members 150 is mounted in a corresponding one of the mounting through holes 121 and 131.

Each of the fixing members 150 is easily inserted through a corresponding one of the mounting through holes 121 and 131 outward from the inside of a corresponding one of the cell covers 120 and 130 due to the tapered structure of the first protruding part 152. Each of the fixing members 150 is elastically coupled in corresponding one of the mounting through holes 121 and 131 due to elasticity of each of the fixing members 150.

When the battery cell stack 110 is loaded in a state in which the fixing members are mounted in the cell covers 120 and 130, the second protruding parts 154 of the respective fixing members 150 come into elastically tight contact with the upper and lower corners of the battery cell stack 110 to stably fix the battery cell stack 110.

Meanwhile, side sealed parts 116 and 117 of the battery cells constituting the battery cell stack are bent in response to the internal space between the cell covers 120 and 130.

In the above description, the structure in which the battery cell stack is fixed by the two fixing members coupled to the cell covers has been described with reference to the drawings showing only a portion of the battery module for the convenience of description. In actuality, however, eight fixing members are mounted at the cell covers such that the eight fixing members contact four upper corners and four lower corners of the battery cell stack.

Figure 7:
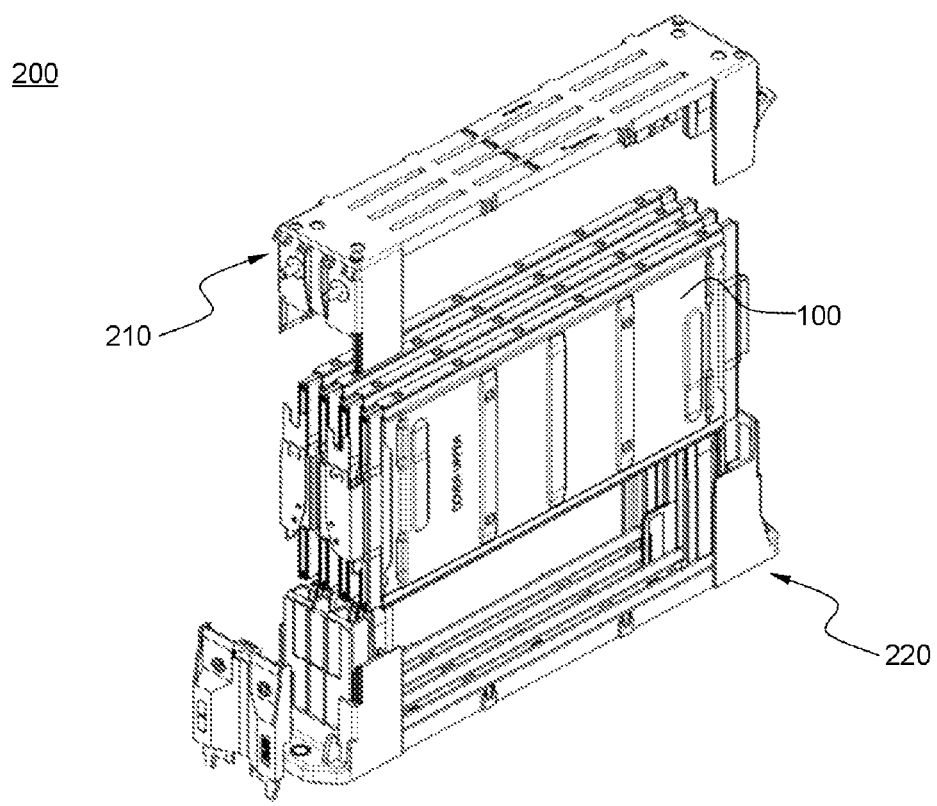
FIG. 7 is a perspective view showing a battery pack manufactured by stacking a plurality of battery modules.

FIG. 7 is a perspective view typically showing a battery pack manufactured by stacking a plurality of battery modules.

Referring to FIG. 7, four battery modules 100 according to the present invention constitute one battery pack 200. Consequently, the battery pack 200 includes a total of eight battery cells. That is, a stack of the four battery modules 100 is mounted between an upper frame 210 and a lower frame 220 in a state in which the stack of the four battery modules 100 is erected in a lateral direction to manufacture the battery pack 200.

A plurality of battery packs 200 may be connected to manufacture a middle or large-sized battery assembly having higher power and capacity.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the battery module according to the present invention is configured to have a structure in which the battery cells mounted in the cell covers are fixed by the fixing members made of an elastic material. Consequently, the battery cell stack is fixed in place and, in addition, breakdown, short circuits, or malfunction of the battery cells due to external force or vibration is prevented, thereby improving safety of the battery module.

In addition, a deviation in dimensions between the battery cell stack and the cell covers caused during the manufacturing process is eliminated by the fixing members. Consequently, it is possible to reduce a product detect ratio and, in addition, to manufacture a battery module having more stable structure.

The invention claimed is:

1. A battery module comprising a plurality of battery cells, the battery module comprising:
    the battery cells being stacked in a state in which electrode terminals are electrically connected to each other;
    a pair of cell covers coupled to each other to surround the entirety of an outside of a battery cell stack comprising two or more battery cells excluding the electrode terminals of the battery cells; and
    fixing members mounted at the cell covers in contact with the outside of the battery cell stack to properly fix the battery cells in the cell covers,
    wherein the cell covers are provided with mounting through holes and the fixing members are mounted at the cell covers in a state in which the fixing members are inserted through the mounting through holes.

2. The battery module according to claim 1, wherein each of the battery cells is a plate-shaped battery cell.

3. The battery module according to claim 2, wherein the plate-shaped battery cell is configured to have a structure in which the electrode terminals are formed at upper and lower ends of the plate-shaped battery cell.

4. The battery module according to claim 1, wherein the electrode terminals of the battery cells are connected in series to each other.

5. The battery module according to claim 4, wherein the electrode terminals are directly connected to each other in a state in which the electrode terminals are bent.

6. The battery module according to claim 1, wherein each of the battery cells is a pouch-shaped cell having an electrode assembly mounted in a case made of a laminate sheet comprising a metal layer and a resin layer.

7. The battery module according to claim 1, wherein each of the fixing members is made of an elastic material.

8. The battery module according to claim 7, wherein the elastic material is thermo plastic polyurethane (TPU) or silicone.

9. The battery module according to claim 1, wherein each of the fixing members is configured to have a structure in which one side of each of the fixing members is tapered in a longitudinal direction of each of the fixing members such that the fixing members can be easily inserted through the mounting through holes.

10. The battery module according to claim 1, wherein each of the fixing members comprises a first protruding part protruding outwardly of a corresponding one of the cell covers in a state in which the first protruding part is inserted through a corresponding one of the mounting through holes, a second protruding part protruding inwardly of a corresponding one of the cell covers, the second protruding part contacting the outside of the battery cell stack, and a connection part inserted through a corresponding one of the mounting through holes.

11. The battery module according to claim 10, wherein the first protruding part is configured to have a tapered structure in which the first protruding part can be easily inserted through a corresponding one of the mounting through holes and the second protruding part is formed in an arc shape.

12. The battery module according to claim 1, wherein the fixing members comprise two or more fixing members mounted at the cell covers.

13. The battery module according to claim 12, wherein the fixing members comprise a first fixing member contacting an upper corner of the battery cell stack and a second fixing member contacting a lower corner of the battery cell stack.

14. The battery module according to claim 12, wherein the cell covers are provided with step parts corresponding to the upper corner and the lower corner of the battery cell stack, and the first fixing member and the second fixing member are mounted at the step parts of the cell covers.

15. The battery module according to claim 14, wherein the battery cell stack is formed in the shape of a rectangular parallelepiped, and the fixing members comprise at least eight fixing members mounted at the cell covers such that the fixing members contact four upper corners and four lower corners of the battery cell stack.

16. The battery module according to claim 1, wherein each of the battery cells is a lithium secondary battery.

17. A battery pack comprising a battery module according to claim 1 as a unit module.

18. A device comprising a battery pack according to claim 17.

19. The device according to claim 18, wherein the device is an electric vehicle, a hybrid electric vehicle, a plug-in hybrid electric vehicle, or a power storage unit.

20. A battery module comprising a plurality of battery cells, the battery module comprising:
    the battery cells being stacked in a state in which electrode terminals are electrically connected to each other;
    a pair of cell covers coupled to each other to surround the entirety of an outside of a battery cell stack comprising two or more battery cells excluding the electrode terminals of the battery cells; and
    fixing members mounted at the cell covers in contact with the outside of the battery cell stack to properly fix the battery cells in the cell covers,
    wherein the fixing members comprise two or more fixing members mounted at the cell covers, and a first fixing member contacts an upper corner of the battery cell stack and a second fixing member contacts a lower corner of the battery cell stack.

* * * * *